(12) United States Patent
Bhaskar et al.

(10) Patent No.: US 7,034,968 B2
(45) Date of Patent: Apr. 25, 2006

(54) COLOR CALIBRATION CHART

(75) Inventors: Ranjit Bhaskar, Portland, OR (US);
Jay S Gondek, Camas, WA (US);
Thomas G Berge, Camas, WA (US);
Jefferson P Ward, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 971 days.

(21) Appl. No.: 09/943,923

(22) Filed: Aug. 31, 2001

(65) Prior Publication Data

US 2003/0043424 A1  Mar. 6, 2003

(51) Int. Cl.
*H04N 1/46* (2006.01)

(52) U.S. Cl. .................. 358/504; 358/1.8; 358/1.9; 358/406

(58) Field of Classification Search .......... 358/504, 358/406

See application file for complete search history.

(56) References Cited

U.S. PATENT DOCUMENTS

| | | | |
|---|---|---|---|
| 4,611,893 A | 9/1986 | Schrier | 351/239 |
| 4,660,948 A | 4/1987 | Retz | 351/239 |
| 5,579,031 A | 11/1996 | Liang | |
| 5,604,567 A | 2/1997 | Dundas et al. | 399/39 |
| 5,801,809 A | 9/1998 | Husain | 351/239 |
| 5,995,714 A * | 11/1999 | Hadley et al. | 358/1.9 |
| 6,030,066 A | 2/2000 | Li et al. | 347/19 |
| 6,034,711 A | 3/2000 | Trask et al. | 347/240 |
| 6,100,907 A | 8/2000 | Uffel | |
| 6,204,873 B1 * | 3/2001 | Shimazaki | 347/172 |

FOREIGN PATENT DOCUMENTS

| | | |
|---|---|---|
| EP | 0794657 | 9/1997 |
| JP | 01-130056 | 5/2001 |
| WO | WO 00/36819 | 7/2000 |

OTHER PUBLICATIONS

European Search Report dated Aug. 23, 2002.

\* cited by examiner

*Primary Examiner*—Kimberly Williams
*Assistant Examiner*—Yixing Qin

(57) ABSTRACT

A test page produced by ink pens for calibrating drop weights for at least a first and a second printheads, comprising: a page with an area for color swatches; a plurality of color swatches disposed in the area; and a predetermined substantially uniform color background disposed in said area between and around said plurality of color swatches. In a system embodiment of the present invention, a sensor may be used for sensing spectral data for each color swatch in a plurality of color swatches; and a component may be provided for comparing the sensed spectral data for each color swatch in a plurality of the color swatches to spectral data for the background color and selecting one of the plurality of color swatches which has spectral data which is closest to the background color for use in adjusting ink volume for at least one of the ink pens.

14 Claims, 2 Drawing Sheets

COLOR CALIBRATION CHART

FIELD OF THE INVENTION

The present invention relates to the field of calibration of printer pens.

BACKGROUND OF THE INVENTION

Many inkjet printers contain cyan, magenta and yellow pens that share the same printhead. Because of this printhead sharing, exit orifice diameters for all three pens are very similar and the resulting pen drop volumes are nearly identical. Therefore, even when pens are changed, colors tend to remain in balance for any given image that is printed out. However, there are a few exceptions to this type of inkjet printer, and these exception printers use independent color pens that do not necessarily correlate well with each other. These exception pen sets can cause noticeable hue shifts in color images unless the pen manufacturing process exhibits extremely tight tolerances. Such color shifts could make blue skies have a greenish tint or a red apple appear orange. Due to the dramatic negative effect this can have on print quality, many such printers allow the user to compensate with a manual color calibration process.

Earlier versions of Manual Color Calibration (MCC) for inkjet printers incorporated aspects of a color to black ink relationship. The MCC developed for one earlier version of a printer is shown in FIG. 1A and comprises a 3×3 pattern of test bars. The MCC developed for another earlier version of a printer is shown in FIG. 1B and expands the original pattern to a 7×7 pattern of test bars. The pattern used in both prior art MCC's is a paired series of color bars (cyan, magenta and yellow combination only) and adjacent gray (black ink only) bars distributed across an entire page. The colored bar in these figures is formed by holding cyan constant and then varying the magenta and yellow. In the figures, the color bar is on the left in each pair, and the gray bar is on the right. The user then selects the pair of bars that most closely matches each other. This choice, in turn, is used to adjust the amount of color ink on the page.

The inherent problem associated with the foregoing selection process is that the accuracy of the process is limited by human visual constraints.

SUMMARY OF THE INVENTION

Briefly, the present invention comprises, in one embodiment, a test page produced by ink pens for calibrating drop weights for at least a first and a second printheads, comprising: a page with an area for color swatches; a plurality of color swatches disposed in said area; and a predetermined substantially uniform color background disposed in said area between and around said plurality of color swatches.

In a further aspect of the present invention, a center color swatch disposed in substantially a center of the area containing the plurality of color swatches provides a color from a current setting of ink pens, and wherein a variation of ink drop volumes in a given color swatch relative to ink drop volumes in the center color swatch is dependent on a distance and direction of the given color swatch relative to the center color swatch.

In a further embodiment of the present invention, a method is provided for calibrating color pens for an inkjet printer that includes one or more first printheads and one or more second printheads, comprising the steps of: printing a test page from the inkjet printer to be calibrated, wherein the test page comprises a plurality of color swatches disposed in an area, wherein each of the plurality of color swatches is made from inks from the one or more first printheads, and wherein a predetermined substantially uniform color background made from at least one ink from the one or more second printheads is disposed in the area between and around the plurality of color swatches; and selecting a color swatch which matches the closest to the color background.

DETAILED DESCRIPTION OF THE PREFERRED EMBODIMENT

Figure 1A:
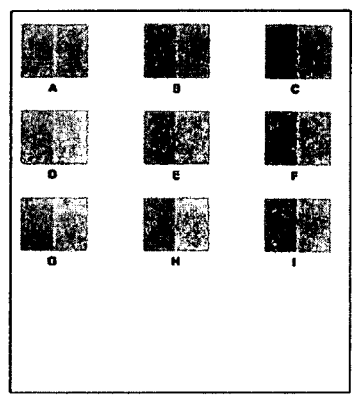
FIG. 1A is a prior art test calibration chart.
Figure 1B:
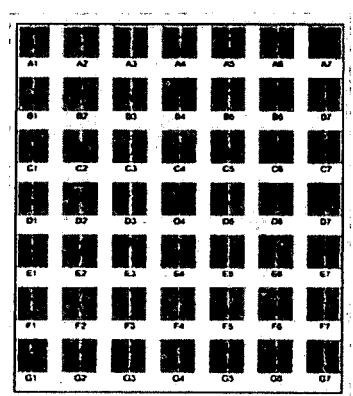
FIG. 1B is a different prior art test calibration chart.

The present invention addresses the issue of color imbalance on printed output. It should be noted that embodiments of the present invention will be described in the context of cyan, magenta and yellow pens and a black ink pen. However, embodiments of the present invention are not limited to this selection of pen colors, and any convenient pen color combination may be used. It should also be noted that although a preferred embodiment of the present invention includes a gray background created from black ink, embodiments of the present invention are not so limited.

As noted previously, pen color imbalance occurs as a result of one or more color pens such as cyan, magenta and yellow pens, being misencoded with incorrect drop weight values. The resulting hue shifts become unacceptable during the course of printing. The solution of the present invention modifies the "effective" drop weight of the color pens and brings colors into balance.

It has been discovered that there are several inherent problems associated with the color calibration charts of the prior art. First, the accuracy attained by users from either prior art pattern illustrated is limited by human visual system constraints. In particular, it has been discovered that the ability to discern slight color differences in ink pattern color swatches is partially determined by the area surrounding each swatch. It has also been determined that full page patterns are not optimal for color discrimination.

The test chart, method and system of the present invention improve upon existing manual color calibration processes by taking advantage of human visual system characteristics. Embodiments of the present invention improve both the range and accuracy of existing methods to manually or automatically correct color imbalance. In one important aspect, an embodiment of the present invention uses a uniform background as a reference between and around the color swatches. In one embodiment of the present invention, this background is a color gray formed from black ink. Note that such a configuration eliminates much of a simultaneous contrast problem associated with manual calibration systems (to be discussed below). This design prevents the eye from compensating for changing background and compensating for the white line between the adjacent pair of bars in the prior art. In a further aspect of an embodiment of the present invention, the physical size of the pattern matrix is reduced to enable the eye to better distinguish hue differences.

As noted, the manual color calibration test chart and process is designed to correct for hue shifts produced by pens that put down more or less ink than expected. In one embodiment, the pens in one example of a printer by Hewlett Packard are encoded with pen drop weights at the end of line using a rolling average method. Algorithms within the printer (not a part of the present invention) read the encoded values for the pens and adjust color maps therein to reflect the increase or decrease from a nominal drop weight. However, the method used to obtain the drop weight only approximates the actual value of the pen. So, for instance, a magenta pen's true drop weight may be 4.5 nanograms but may be encoded as 4.0 nanograms. A printer containing such a pen will generate images that put down—$((4.5-4.0)/4.0)*100-$ or $\sim 12.5\%$ more magenta ink than it should due to this mis-estimation. For this example, it will result in blue objects having a pink tint on printed output.

Figure 2A:
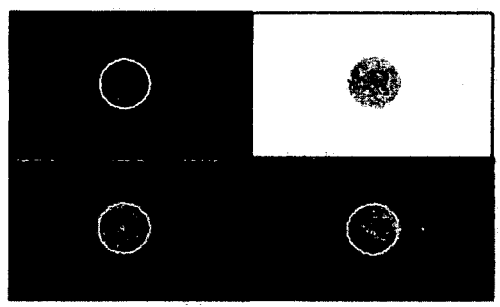
FIGS. 2A and 2B are drawings showing the simultaneous contrast effect.
Figure 2B:
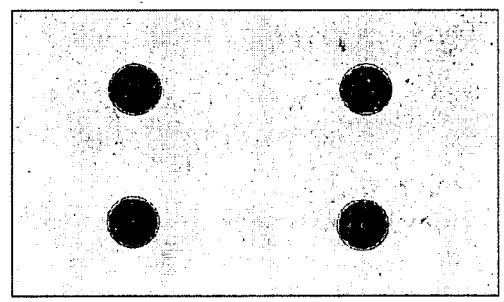

An aspect of an embodiment of the present invention involves the concept of simultaneous color contrast. The ability to resolve apparent differences between pairs of bars is partially dependent upon the surround. FIGS. 2A and 2B show this effect in an exaggerated form. All the dots in FIG. 2A are the same color. The different appearance is due to the perceived lateral and surround interactions of the colors around each dot. If the same background is used FIG. 2B), the dots look alike. Thus, as in this example, corner pairs in a test calibration chart in accordance with the prior art MCC are viewed differently by manual calibrators than pairs in the middle of the page and lead to incorrect selections. The test chart of the present invention is designed to provide a background which limits contrast effects.

A further advantage of an embodiment of the present invention is the use of a reduced pattern size. The advantage of using a reduced pattern can be understood through an understanding of cone receptors in the eye. Cone receptors are photoreceptors concentrated in the fovea at the back of the eye. This area subtends an arc of about 5 degrees and is the most color-sensitive part of the retina. Because earlier prior art versions of the MCC utilized a full 8×10 inch page, comparisons of paired blocks from different part of the page relied on "retinal memory" to remember the level of color difference as each pair was evaluated. For example, at arm's length (or approximately 24 inches), the field-of-view subtended by the concentration of color-sensitive cones in the eye covers about 2 inches of the page. This describes the size of the area where individuals can best differentiate between like colors. In earlier MCC patterns, this 2-inch range would encompass no more than the nearest neighbor paired swatches.

However, this 2-inch range in the preferred embodiment of the present invention, includes 81 color swatches in a 13 cm by 13 cm area. The meaningful result from this discovery is that the user will make more accurate choices and be less likely to focus on the wrong area of the calibration page.

Figure 3:
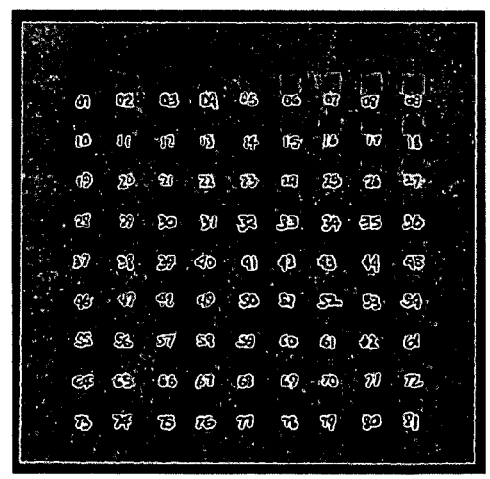
FIG. 3 is a color drawing of a preferred embodiment of the color test calibration chart of the present invention.

A preferred embodiment of the test chart of an embodiment of the present invention is shown in FIG. 3. As with earlier printers, the new calibration page relies on a user's ability to match ink from one pen output (the reference) from one printhead to a composite color produced by one or more other color pens in different printhead, e.g., the ability in one embodiment to match a composite color produced by yellow, cyan and magenta from one or more first printheads to a gray reference color created from black ink from one or more second printheads. The pattern shown in FIG. 3 comprises a page 104 with a plurality of color swatches 204 disposed in an area 304 on the page. The color swatches are formed from the ink from one or more pens in one or more first printheads, e.g., yellow, cyan, and magenta in a preferred embodiment. In a preferred embodiment, the volume from a yellow ink pen is held constant across the plurality of swatches, and the volumes from the cyan and magenta ink pens are varied in each of the different color swatches. In the embodiment shown in FIG. 3, the percentage of cyan varies along the horizontal axis, while magenta varies along the vertical axis. The ink from a pen from one or more second printheads, e.g., black ink, is used to form the background and is held constant. In the embodiment of the chart shown in the figure, 81 swatches are shown, numbered from left to right in the top row from 1–9, and from left to right in the bottom row as 73–81.

In operation, the user chooses the color swatch that best matches that the background, e.g., the black ink-only background in FIG. 3. In a preferred embodiment, the center color swatch is set to have the nominal drop weights for the printer. In this preferred embodiment, the further away the selected swatch is from the center nominal drop weight swatch, the greater the difference between the printer's pen drop weights and those that are considered nominal. In the case of the aforementioned example HP printer, each adjacent swatch represents a 10 percent jump from its neighbor. For instance, if a user selects '67', that would imply that a printer calibrated using this selection would contain pens which are 30% light in magenta (3 rows below center) and 10% heavy in cyan (1 column to the left of center). This information is fed through firmware to adjust color maps to reflect this variation from nominal.

From the above, it can be seen that the background between and around the color swatches is used to provide the uniform reference color, e.g., the gray color from the black ink in the preferred embodiment, and is formed from one or more pens from one or more second printheads, while the color swatch is formed primarily from inks from pens in one or more first printheads. This is in contrast to the gray bar adjacent to each color swatch in the prior art. Note that the use of the background for the black ink eliminates the white line between the color bar and the gray bar in the prior art.

In a preferred embodiment, the color swatches are of a substantially uniform size as can be seen from FIG. 3, and a dimension of the color swatches is less than a distance between adjacent color swatches. In a preferred embodiment, the color swatches are substantially square in shape and the length of one side is about 0.6 cm to 1.5 cm. If the swatch is circular, then the diameter could be 0.6 cm to 1.5 cm. The dimensions are chosen based on what the eye can resolve. The distance between adjacent squares or circles or whatever other convenient shape is used is then larger than this dimension. Note that these dimensions would change if a lens system was used to view the color swatches.

Note that in a preferred embodiment as shown in FIG. 3, there are 81 color swatches disposed in a 13 cm by 13 cm area, as shown in FIG. 3.

It should be noted that the same principles of the present test chart may be applied to most printers, as well as to copy machines and other machines if those machines use color pens.

In one embodiment of the present invention, two or more color swatch matrices may be used on the test calibration chart. By way of example, for the embodiment of FIG. 3 the test chart could provide a first matrix of color swatches on a black ink background with the color swatches in the first matrix formed by holding the yellow ink constant across the color swatches and varying cyan versus magenta as shown in FIG. 3. In addition, the test chart may include one or more matrices of color swatches formed by holding, for example, magenta constant across the color swatches and varying cyan and yellow across the color swatches, and/or a matrix of color swatches formed by holding cyan constant across the color swatches and varying magenta and yellow across the swatches. This multi-matrix configuration would average out user errors and provide more consistent results.

In a yet further embodiment of the present invention, variations in volume for the pen or pens in the one or more printheads used to create the reference background, e.g., in the embodiment of FIG. 3 the black pen, may be compensated by varying the amount of black ink across a matrix of swatches and using a constant color background, e.g., a gray background made of cyan, magenta and yellow.

Figure 4:
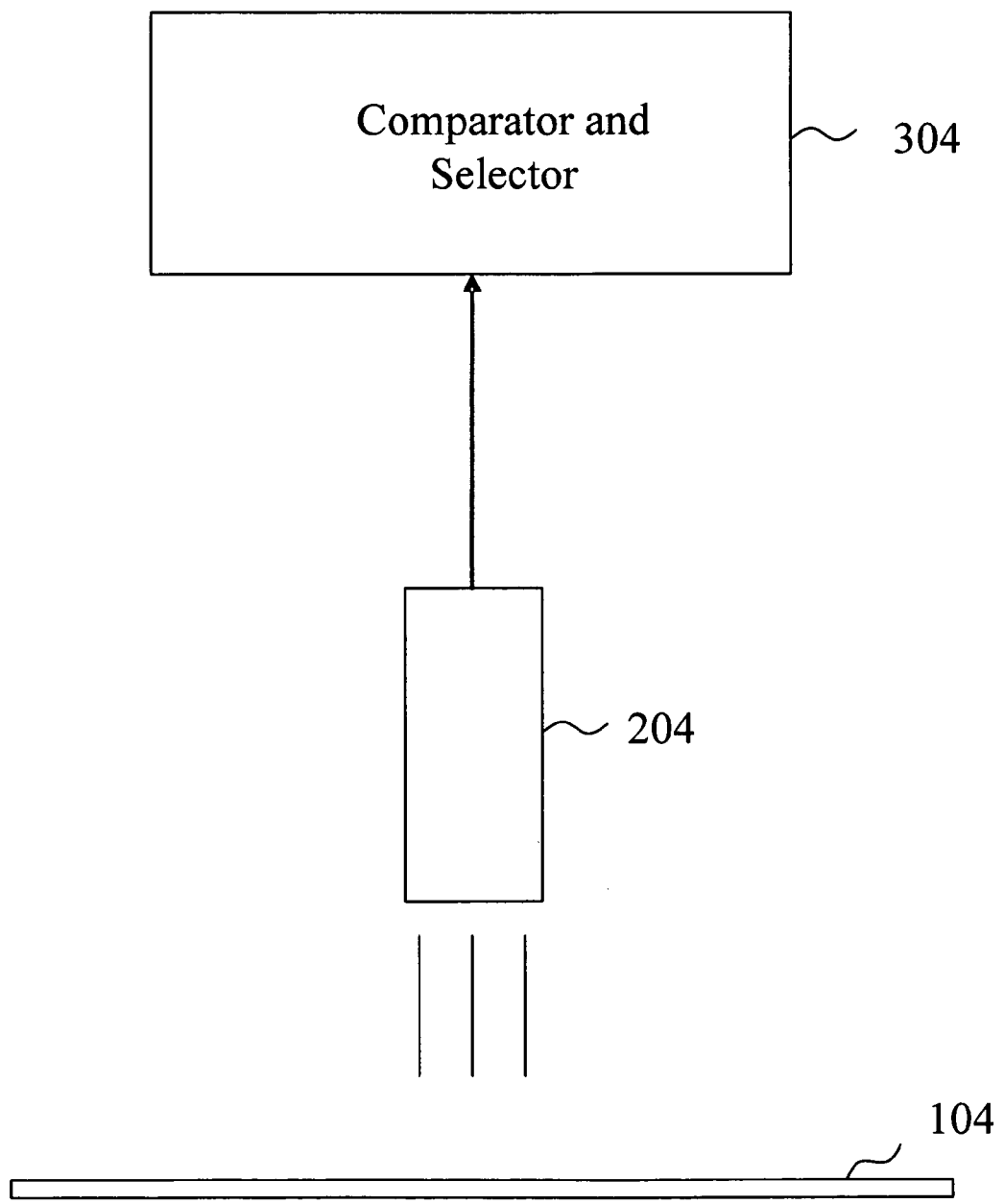
FIG. 4. Is a schematic block diagram of a system for automatically selecting a color swatch for adjusting colored ink pen volume.

In yet a further embodiment of the present invention, the selection of the color swatch could be performed automatically. Such an embodiment is shown in FIG. 4. Referring to FIG. 4, there is shown a side view of a test calibration chart 10 formed in accordance with the present invention. A sensor 20 may be positioned to measure spectral data from each of a plurality of the color swatches. A signal representative of this spectral data would be provided to a comparator/selector component 30. The comparator/selector component 30 would also receive spectral data from the reference background via the sensor 20, or from a different sensor, or could have a predetermined spectral data for the reference background preset therein. The comparator/selector 30 would make a comparison of the spectral data from each of the plurality of swatches to the spectral data from the reference background, and could select the color swatch with the spectral data that most closely matches the spectral data of the reference background.

In one implementation of this embodiment, an LED could be used to shine light on each of the color swatches, and the sensor 20 could comprise a reflectance sensor to sense the reflectance from the color swatch and compare that reflectance to the reflectance value for the reference background, e.g., in one embodiment the black ink background. The sensor 20 could be positioned above each color swatch, or the paper 10 could be moved to accomplish the same positioning, or some other convenient method such as sensor inclination could be used to have the sensor 20 individually obtain the reflectance from each color swatch. Alternatively, multiple sensors 20 could be utilized to accomplish the foregoing.

It should be noted that the preferred embodiment of the present invention has been described in the context of a gray background formed from black ink, and wherein the color swatches are formed using three inks. The present invention is not limited to this configuration. More specifically, the color swatches may be from one or more inks from one or more pens in one or more first printheads, and the background may be formed by one or more inks from one or more pens in one or more second printheads different from the first printheads.

Thus, embodiments of the present invention enable a user to more easily compensate for inaccurate pen drop weights, to increase the range and accuracy level of existing methods of calibration, and to allow for added functionality by reducing the size of the MCC pattern. Reducing pattern size is advantageous to take advantage of the fact that the human visual system best responds to color contrast within a very small area, and to allow for the addition of further functionality within the MCC page, e.g., adding written instructions, expanding to include multiple patterns.

Accordingly, it can be seen that a significant improvement is achieved in the current scheme of ink pen calibration by using a uniform background as an ink reference to limit contrast effects, and in a preferred embodiment, subtending a smaller angle with the calibration matrix of color swatches to take advantage of the concentration of eye receptor cones.

The foregoing description of a preferred embodiment of the present invention has been presented for purposes of illustration and description. It is not intended to be exhaustive or to limit the invention to the precise form disclosed, and modifications and variations are possible in light of the above teachings or may be acquired from practice of embodiments of the invention. The embodiments were chosen and described in order to explain the principles of the invention and its practical application to enable one skilled in the art to utilize embodiments of the invention with various modifications as are suited to the particular use contemplated. It is intended that the scope of the invention be defined the claims appended hereto, and their equivalents.

What is claimed is:

1. A method for calibrating color pens for an inkjet printer that includes one or more first printheads and one or more second printheads, comprising the steps of: printing a test page from the inkjet printer to be calibrated, wherein the test page comprises a plurality of color swatches disposed in an area, wherein each of the plurality of color swatches is made from inks from the one or more first printheads, and wherein a predetermined substantially uniform color background made from at least one ink from said one or more second printheads is disposed in said area between and around said plurality of color swatches; and selecting, using a sensor component, a color swatch which matches the closest to the color background.

2. The method as defined in claim 1, wherein said color swatches are of a substantially uniform size, and wherein a dimension of said color swatches is less than a distance in said area between adjacent color swatches.

3. The method as defined in claim 2, wherein each of the plurality of color swatches is substantially square.

4. The method as defined in claim 1, wherein said plurality of color swatches comprises 9–81 color swatches in the area, and wherein the area is substantially a square of 13 or less centimeters.

5. The method as defined in claim 1, wherein the background color is gray made from black ink.

6. A method for calibrating color pens for an inkjet printer that includes one or more first printheads and one or more second printheads, comprising the steps of: printing a test page from the inkjet printer to be calibrated, wherein the test page comprises a plurality of color swatches disposed in an area, wherein each of the plurality of color swatches is made from inks from the one or more first printheads, and wherein a predetermined substantially uniform color background made from at least one ink from said one or more second printheads is disposed in said area between and around said plurality of color swatches; and selecting a color swatch which matches the closest to the color background;
   wherein the selecting step is performed automatically by a sensor sensing the spectral data of each of a plurality of the color swatches to the background color, and the step of determining which color swatch has spectral data which is a closest match to the background color.

7. The method as defined in claim 1, wherein the selecting step is performed manually.

8. The method as defined in claim 6, wherein the test page includes a second plurality of color swatches disposed in a second area on the test page, wherein the first-mentioned plurality of color swatches are formed by holding one color ink constant across the swatches and varying two other color inks, and wherein the second plurality of color swatches are formed by holding a different color ink constant across the swatches as compared ink held constant in the first-mentioned plurality of color swatches and varying two other color inks; wherein the sensing step comprises sensing spectral data for a plurality color swatches in the second plurality; and wherein the comparing step compares the sensed spectral data for each color swatch in the second plurality of the color swatches to spectral data for the background color in the second area and selects one of the plurality of color swatches in the second plurality of color swatches which has spectral data which is closest to the background color in the second area.

9. The method as defined in claim 1, wherein a center color swatch disposed in substantially a center of the area containing the plurality of color swatches provides a color from a current setting of ink pens, and wherein a variation of ink drop volumes in a given color swatch relative to ink drop volumes in the center color swatch is dependent on a distance and direction of the given color swatch relative to the center color swatch.

10. A system for calibrating color pens for an inkjet printer that includes one or more first printheads and one or more second printheads, comprising: a test page with an area for color swatches, with a plurality of color swatches disposed in said area, and a predetermined substantially uniform color background disposed in said area between and around said plurality of color swatches; and a sensor for sensing spectral data for each color swatch in a plurality of color swatches; and a component for comparing the sensed spectral data for each color swatch in a plurality of the color swatches to spectral data for the background color and selecting one of the plurality of color swatches which has spectral data which is closest to the background color for use in adjusting ink volume for at least one of the ink pens.

11. The system as defined in claim 10, wherein said color swatches are of a substantially uniform size, and wherein a dimension of said color swatches is less than a distance in said area between adjacent color swatches.

12. The system as defined in claim 10, wherein the test page includes a second plurality of color swatches disposed in a second area on the test page, wherein the first-mentioned plurality of color swatches are formed by holding one color ink constant across the swatches and varying two other color inks, and wherein the second plurality of color swatches are formed by holding a different color ink constant across the swatches as compared to the ink held constant in the first-mentioned plurality of color swatches and varying two other color inks; wherein the sensor senses spectral data for a plurality color swatches in the second plurality; and wherein the component for comparison and selection compares the sensed spectral data for each color swatch in the second plurality of the color swatches to spectral data for the background color in the second area and selects one of the plurality of color swatches in the second plurality of color swatches which has spectral data which is closest to the background color in the second area for use in adjusting ink volume for at least one of the ink pens.

13. The system as defined in claim 10, wherein each of the plurality of color swatches is made from ink from the one or more first printheads, and wherein the color background is made from an ink from said one or more second printheads.

14. The system as defined in claim 10, wherein a center color swatch disposed in substantially a center of the area containing the plurality of color swatches provides a color from a current setting of ink pens, and wherein a variation of ink drop volumes in a given color swatch relative to ink drop volumes in the center color swatch is dependent on a distance and direction of the given color swatch relative to the center color swatch.

* * * * *